United States Patent [19]

Roulstone

[11] Patent Number: 4,567,670
[45] Date of Patent: Feb. 4, 1986

[54] GUAGE AND METHOD FOR MEASURING TAPERED INTERNAL AND EXTERNAL THREADS

[76] Inventor: James E. Roulstone, 5303 L. Creek La., Spring, Tex. 77379

[21] Appl. No.: 631,064

[22] Filed: Jul. 16, 1984

[51] Int. Cl.⁴ ............................................. G01B 3/40
[52] U.S. Cl. ................................ 33/504; 33/199 R; 33/545; 33/531
[58] Field of Search ............ 33/199 R, 199 B, 174 E, 33/504, 545

[56] References Cited

U.S. PATENT DOCUMENTS

| | | |
|---|---|---|
| 2,874,475 | 2/1959 | McGaffey . |
| 3,082,538 | 3/1963 | Theuerkauf ...................... 33/199 R |
| 4,148,146 | 4/1979 | Holland ............................ 33/199 R |
| 4,189,843 | 2/1980 | Baldwin . |
| 4,324,049 | 4/1982 | Blose ................................ 33/199 B |

Primary Examiner—William D. Martin, Jr.
Attorney, Agent, or Firm—Gunn, Lee & Jackson

[57] ABSTRACT

A thread guage for indirectly determining the pitch diameter and taper of threads on casing and tubing is disclosed. In the preferred and illustrated embodiment, the thread guage includes a pair of adjustable thread engaging arm assemblies mounted on a bar member. The arm assemblies are selectively locked along the bar member, the distance between the arm assemblies being a fixed position corresponding to a specified thread size. At least two indicators are mounted on one of the arm assemblies providing a value of the measured thread dimensions relative to a standard, which value is used to determine pitch diameter and taper of the thread.

18 Claims, 13 Drawing Figures

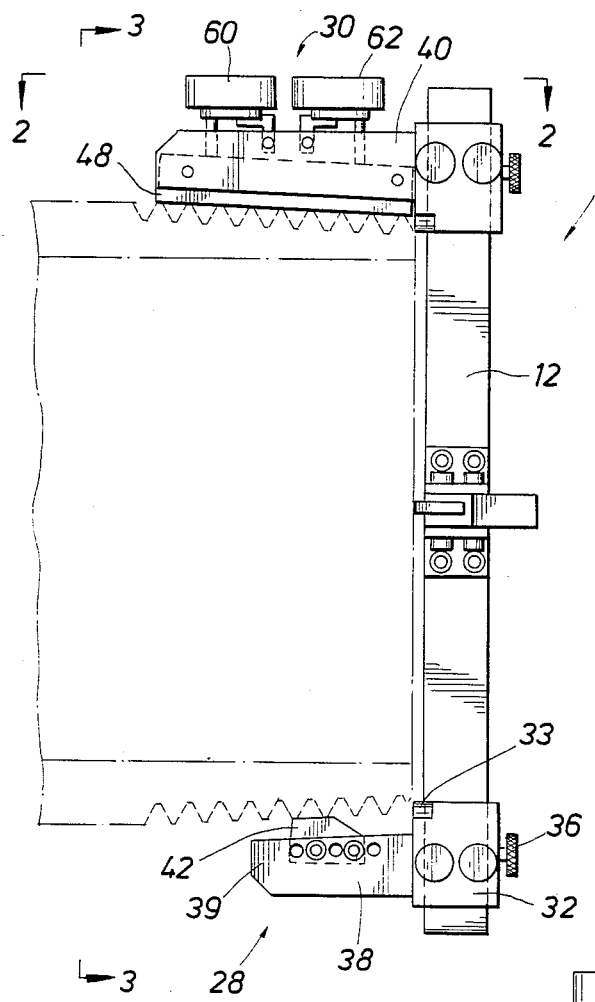
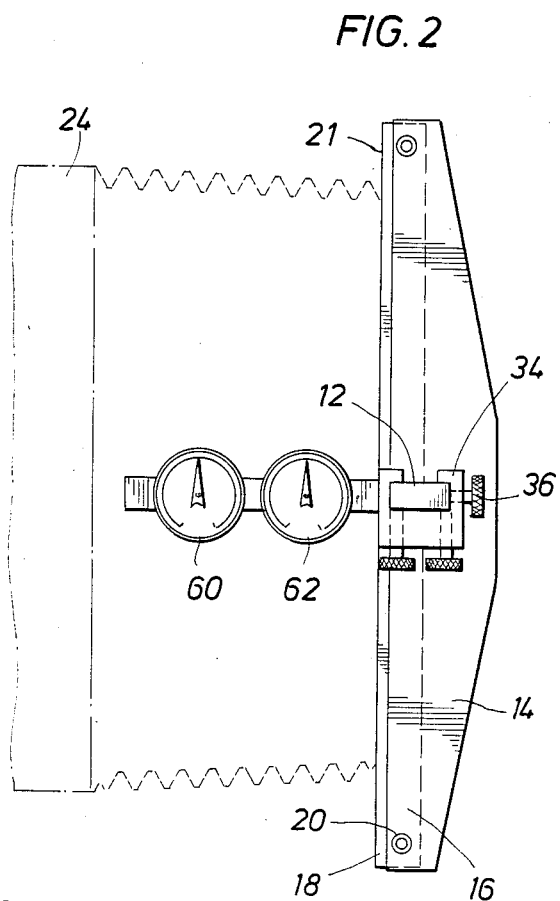
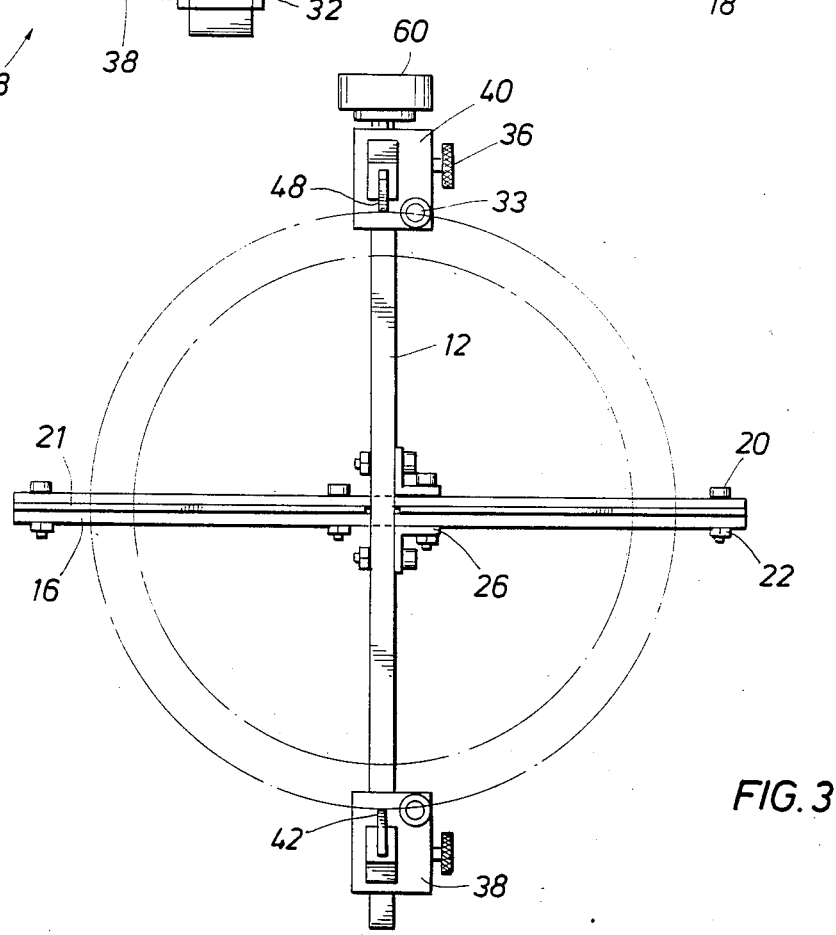
FIG. 1
FIG. 2
FIG. 3

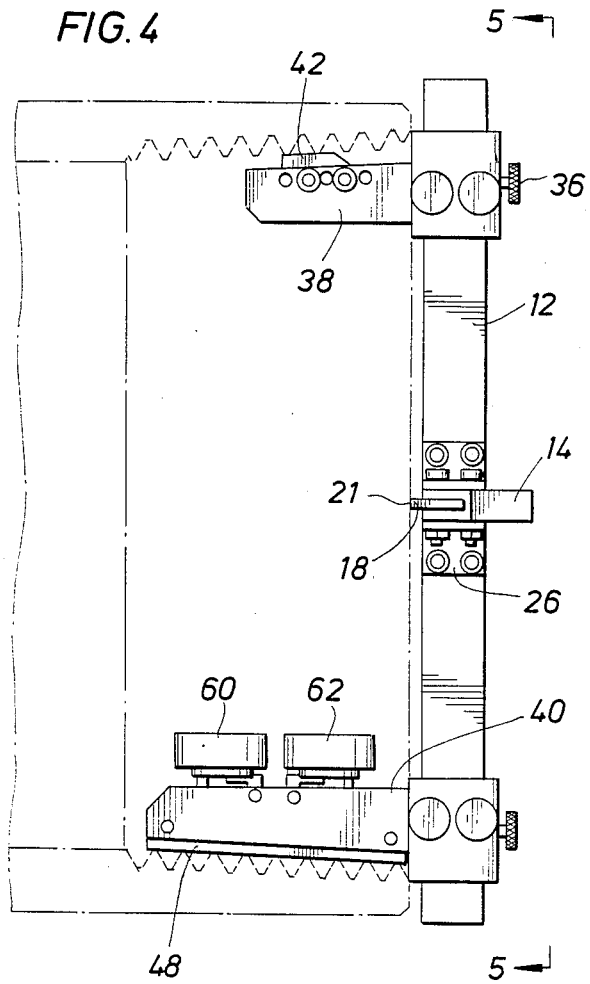
FIG. 4
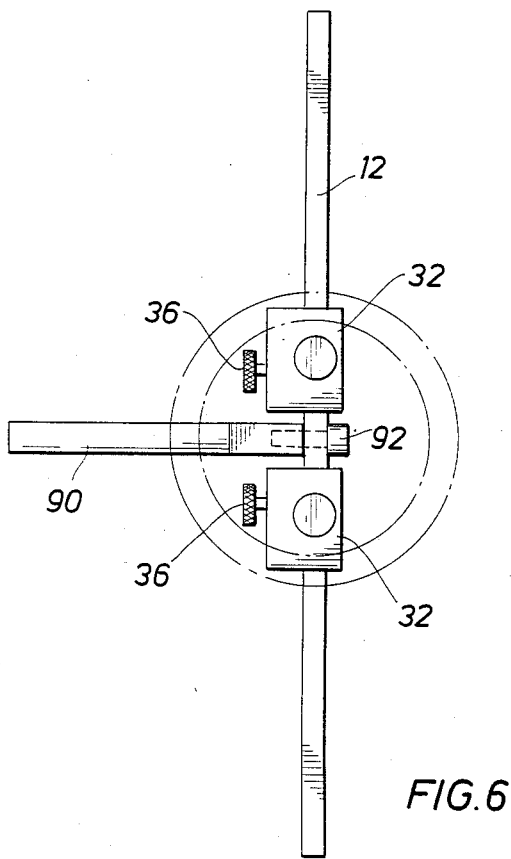
FIG. 6
FIG. 5

GUAGE AND METHOD FOR MEASURING TAPERED INTERNAL AND EXTERNAL THREADS

BACKGROUND OF THE DISCLOSURE

This invention relates to a thread guage, particularly a thread guage for indirectly and simultaneously measuring the pitch diameter and taper of threaded pipe ends.

In the production of oil and gas, pipe segments connected in a continuous "string" of tubing or pipe are utilized for transporting well fluids from the producing formation to the surface and for transporting well fluids from location to location on the surface. The connection between the pipe segments is very important to the proper performance of the pipe string. Threads are provided at each end of each pipe segment for joining the pipe segments into a continuous string of pipe. Different sizes of pipe are utilized in the completion of an oil well and therefore several different thread configurations are applied to the pipe segments. Primarily, all thread configurations satisfy at least two common criteria; they must resist leakage and tensile failures. Proper connection between pipe segments is, therefore, of major importance to proper performance of the pipe string. To accomplish this in a variety of circumstances various threads have been specifically designed for use in the oil industry. The threads are machined on the pipe end. Proper thread cutting is verified by laboratory and prototype testing prior to marketing. Also, field inspection of threads is routinely made to assure that the connection between pipe segments can be dimensionally accurate.

In order to insure proper thread connections, the size and configuration of certain non-proprietary threads used on the end of pipe segments have been standardized by the oil industry. In addition, proper connection procedures used for joining these pipe segments have been standardized for connecting specific pipe configurations. The standards specifying the size configuration and orientation of threads on the ends of pipe segments used in the oil and gas industry are set forth by the American Petroleum Institute (API) in its Specification For Threading, Guaging, And Thread Inspection Of Casing, Tubing, And Line Pipe Threads. This publication sets forth the standard dimensions characteristic of the various API thread configurations. In particular, the pitch diameter and taper characteristic of various size threaded pipe is specified.

The thread design is verified at the pipe mill and guaged for conformance with API standards. However, field inspection of the pipe threads is routinely done to determine thread damage which may have occurred during shipment and also to identify any off-specification threads not found at the mill. It is important to locate damaged or off-specification pipe. However, rejecting "good" pipe results in a financial burden on the mill and/or the operator. Thus, inspection must be performed by qualified personnel according to prescribed standards.

The published industry standards for determining conformity of threads provide certain standard guaging procedures for measuring the critical dimensions and configurations of threads. The published procedure also includes a discussion of the proper use of various guaging devices. Generally, two types of guages are advocated for thread inspection; dial indicating guages and fixed guages. The dial indicator guages are provided with a dial indicator, which when placed on the thread must read within a certain range if the thread is within specification. The fixed guage is a rigid guage which is screwed onto the thread. The thread is properly machined if the other thread elements are within specification and the fixed guage stand-off is within specification. Compliance with standard guaging procedures and use of recommended guaging devices is generally accepted in the industry for field inspection of pipe threads and accurately identifying at least acceptable threaded pipe within an acceptable range of the standardized specifications. However, prior art guaging devices may give unreliable readings. For example, API ring and plug guages "assume" a perfectly round thread form. If the pipe segment is out-of-round, the thread form will be out-of-round resulting in an erroneous reading from the ring or plug guage.

The types of guages typical of the prior art used in field inspection of threads have now always provided an accurate indication of the acceptability of a thread being measured for use in a pipe string. For example, use of the prior art devices, according to the standardized procedure, results only in a determination of whether a particular thread is acceptable within the specified standards. The prior art devices may reject the thread forms, but they do not quantify the error. The prior art devices are used to either accept or reject a specific thread as being within the prescribed standard. They do not determine the compatibility of threads, particularly when the threads are not within standard specifications.

The thread guages described in U.S. Pat. No. 2,840,475 to McGaffey and U.S. Pat. No. 4,189,843 to Baldwin are typical of the prior art devices which are capable of measuring thread dimensions of threads formed on the ends of pipe. The devices described by McGaffey and Baldwin are adjustable for identification of a predetermined or sought pitch diameter and taper. The devices are preset and placed on a threaded pipe end. If the thread is within standard specifications, the thread guage will contact the thread at a specified point. Proper use of the thread guages requires accurate presetting of the devices and determination of the contact point with the thread being measured. Thus, repetition of results is difficult to obtain, particularly when different personnel use the devices.

SUMMARY OF THE INVENTION

The present invention discloses a thread guage for indirectly guaging the pitch diameter and the taper of threads formed on the ends of pipe. The thread guage of the invention includes a pair of adjustable arm assemblies which are mounted on a bar member. The arm assemblies are selectively locked along the bar member and include thread engaging elements. At least two indicator guages are carried on one of the arm assemblies for comparing the measured thread dimensions relative to a standard. The values indicated by the guages are utilized in a calculation to determine pitch diameter and taper of the thread being measured.

BREIF DESCRIPTION OF THE DRAWINGS

So that the manner in which the above recited features advantages and objects of the present invention are attained and can be understood in detail, a more particular description of the invention, briefly summarized above, may be had by reference to the embodiments thereof which are illustrated in the appended drawings It is to be noted, however, that the appended drawings illustrate only typical embodiments of this invention and are, therefore, not to be considered limiting of its scope, for the invention may admit to other equally effective embodiments.

FIG. 1 is a side elevation view of a preferred embodiment of the thread guage of the invention;

FIG. 2 is a side elevation view taken along line 2—2 of FIG. 1;

FIG. 3 is an end plan view of the thread guage of the invention;

FIG. 4 is a side elevation view of a preferred embodiment of the thread guage of the invention used to measure internal threads;

FIG. 5 is an end view taken along line 5—5 of FIG. 4;

FIG. 6 is an end view of an alternate embodiment of the thread guage of the invention used for measuring internal threads;

DETAILED DESCRIPTION OF THE PREFERRED EMBODIMENT

Figure 7:
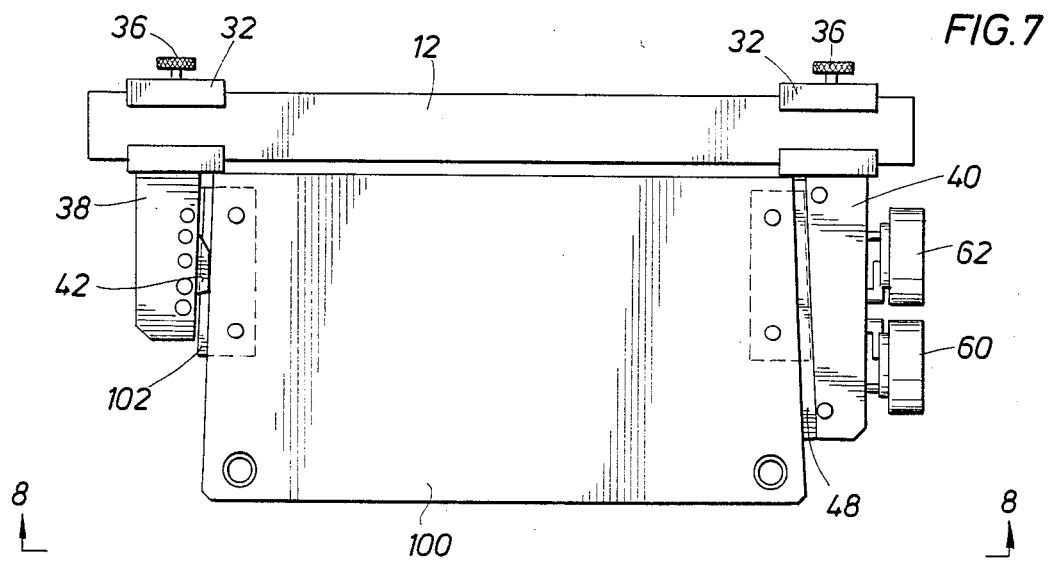
FIG. 7 is a side view of an alternate embodiment of the thread guage of the invention being calibrated against a standard for measurement of external threads.

Attention is first directed to FIG. 1 of the disclosure which depicts one version of the apparatus of the present disclosure utilized to measure dimensions of an external thread. The apparatus is generally identified by the reference numeral 10. The apparatus 10 includes a bar member 12 having an alignment bracket 14 mounted thereon. The bracket 14 includes an enlongated channel defined by a pair of upstanding, spaced and substantially parallel side portions 16 forming the bracket 14. The channel extends from one end of the bracket 14 and terminates at the other end thereof. A pair of substantially rectangular shaped blades or inserts 18 are positioned within the channel and securely fastened to the bracket 14 by bolts 20 which extend through the side portions 16 and the blade inserts 18. The blade inserts 18 are securely fastened to the bracket 14. Nuts 22 are threaded on the bolts 20 (FIG. 3) and tightened so that the blade inserts 18 are captured within the channel of the bracket 14. The blade inserts 18 protrude from the channel and contact the end of the pipe 24 as best shown in FIG. 2. Leading edges 21 of the blade inserts 18 define a plane which is normal to the pin face of the pipe 24. The blade inserts 18 provide a stop surface or shoulder for aligning the apparatus 10 on the end of the pipe 24.

The member 12 is an enlongate bar of rectangular configuration. The bar 12 is received in a transverse slot formed in the bracket 14 and oriented substantially perpendicular to the longitudinal axis of the bracket 14. Angle brackets 26 position the bar 12 at right angles to the bracket 14 as best shown in FIG. 3. Fasteners, for example nuts and bolts, securely fasten the angle brackets 26 to the bar 12 and bracket 14, providing a fixed connection which will withstand even the roughest of field conditions.

A pair of arm assemblies generally designated by the reference numerals 28 and 30 are mounted on the bar 12. The arm assemblies 28 and 30 are adjustable along the bar 12. The arm assemblies 28 and 30 are substantially identical in configuration and construction, and each includes a clamp 32 at one end thereof. The clamp 32 includes a pair of oppositely facing L-shaped flanges 34 which define a channel-like cavity therebetween. The bar 12 is received in the channel formed by the L-shaped flanges 34. The clamps 32 substantially surround the bar 12 as best shown in FIG. 2. A number of threaded holes extend through the back surface of the clamps 32 and at least one of the L-shaped flanges so that set screws 36 may be extended through the holes and into engagement with the bar 12 for locking the arm assemblies 28 and 30 at a selected location thereon.

Integrally formed with the clamps 32 are outwardly projecting arms 38 and 40. The arm 38 extends above the clamp 32 a short distance and is substantially rectangular in shape. An insert receiving slot extends from adjacent the clamp 32 to the free end of the arm 38. The slot is defined by a pair of spaced and parallel members 39 forming the arm 38. A plurality of aligned apertures extend through the members 39 for receiving threaded connectors therethrough to securely fasten a thread engaging arrest insert 42 to the arm 38. The arrest insert 42 presents a contact edge 44 which is substantially parallel to the taper of the thread being measured. The edge 44 is of sufficient length to engage at least two thread crests, but does not extend the full length of the thread form. The arrest insert 42 is adjustable along the arm 38 and is positioned to contact the thread at a specified point.

Figure 11:
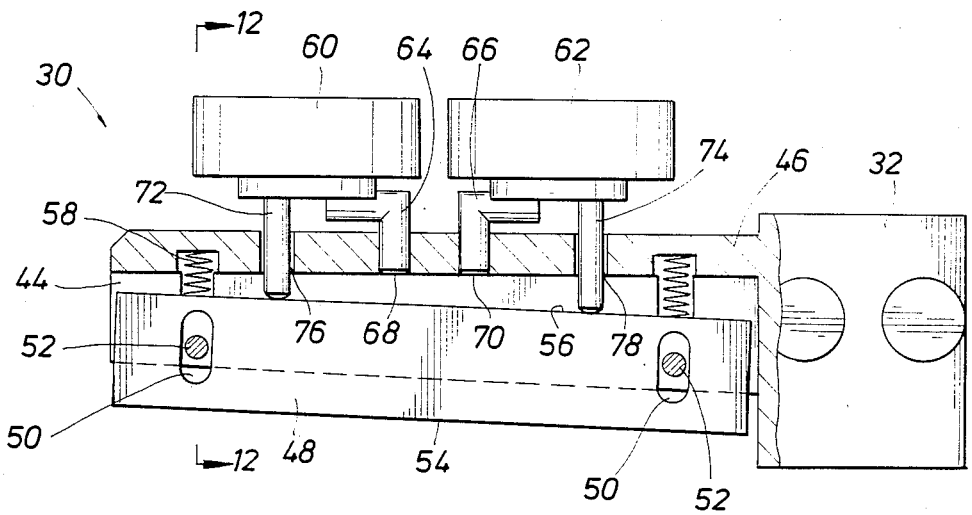
FIG. 11 is an enlarged sectional view of the arm assembly carrying the indicator guages which indicate the deviation from the standard of the thread being measured.
Figure 12:
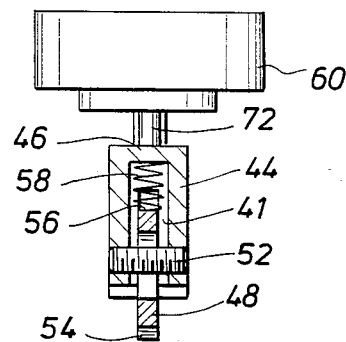
FIG. 12 is a sectional view taken along line 12—12 of FIG. 11.

Turning now to FIG. 11, the arm assembly 30 is shown in greater detail. The arm assembly 30 includes an arm 40 extending from the clamp 32. The arm 40 includes an insert receiving slot 41 defined by a pair of spaced and parallel side members 44 which extend perpendicularly from a back plate 46. The slot 41 is sized to loosely receive a substantially rectangular insert 48. The insert 48 includes a pair of enlongated slots 50 extending therethrough so that guide pins, for example set screws 52, may be extended through the slots 52 and into engagement with the side members 44. The set screws 52 provide a guide for permitting the insert 48 to move in and out of the slot 41. The side members 44 are sufficiently spaced permitting the insert 48 to reciprocate without binding.

The insert 48 has a leading edge 54 and a back edge 56. The leading edge 54 projects outwardly from the slot 41 for engagement with the thread form of the pipe 24. The insert 48 is urged outwardly from the slot 41 by a pair of springs 58 extending from the back plate 46 and contacting the back edge 56 of the insert 48.

The back plate 46 has several apertures extending therethrough for mounting a pair of guages 60 and 62 to the arm assembly 30. The guages 60 and 62 are mounted to the back plate 46 by connecting members 64 and 66 which extend into the apertures 68 and 70, respectively, and are locked to the back plate 46 with set screws. Probes 72 and 74, which are operatively connected to the dial indicators of the guages 60 and 62, extend through apertures 76 and 78 and contact the back edge 56 of the insert 48. Probes 72 and 74 are responsive to movement of the insert 48 and, therefore, movement of the insert 48, inwardly or outwardly in the slot 41, is registered by the guages 60 and 62.

INTERNAL THREAD MEASUREMENT

Turning now to FIGS. 4—6, use of the apparatus 10 for measurement of internal threades is shown. The apparatus 10 is easily adapted for measurement of internal threads by loosening the thumb screws 36 and sliding the arm assemblies 28 and 30 off the bar 12 and reversing the position of the arm assemblies on the bar 12. The arm assemblies 28 and 30 are locked on the bar 12 so that the arms 38 and 40 will extend into the pipe 80 and engage the internal thread 82.

In FIG. 6, an alternate embodiment of the alignment bracket is shown. The bracket 90 is secured to the bar 12 by threaded bolt 92 which extends through the bar 12 and into a threaded hole provided on the end of the bracket 90. For small pipe sizes, the arm assemblies 28 and 30 must be located in close proximity to each other on the bar 12. The configuration of the apparatus 10 shown in FIG. 6 eliminates the angle brackets 26 shown in FIG. 3, permitting the clamps 32 to be positioned adjacent to the support bracket 90 and enable the apparatus 10 to be used for thread gauging measurement of small size pipe.

ALTERNATE VERSION OF DEVICE

Figure 10:
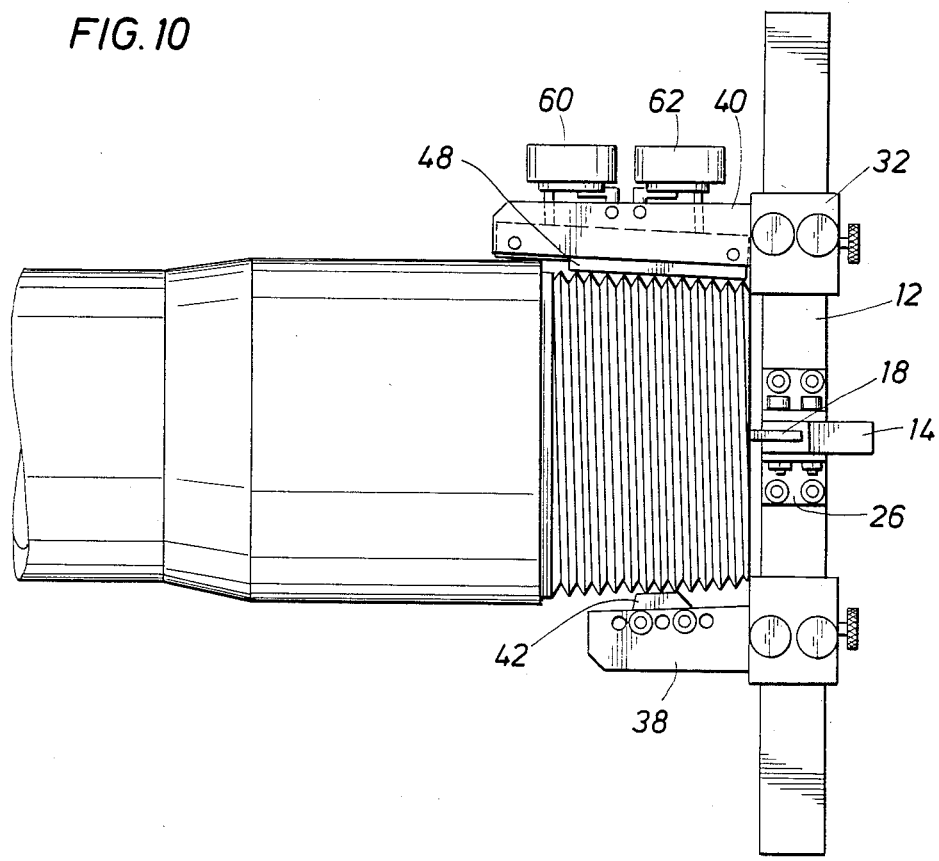
FIG. 10 is a side view of the thread guage of the invention showing an alternate embodiment of the thread engaging arm assemblies.

Referring now to FIG. 10, an alternate embodiment of the arm assemblies 28 and 30 is shown. The total thread length is determined by the size of the pipe. Large pipe has a longer thread length than small pipe. The apparatus 10, however, may be utilized to guage the threads of different size pipe. The arm assemblies 28 and 30 may be profiled to be used for varying pipe sizes and thread design. The thread engaging insert 48 shown in FIG. 10 is notched at the distal end to accommodate a relatively short thread on an upset pipe body. The notch in the insert 48 does not affect the calculation for determining pitch diameter and taper of the thread form. An accurate determination of the pitch diameter and taper of the thread form using the apparatus 10 of the invention can be achieved when substantially the full length of the thread form is contacted by the insert 48.

Figure 8:
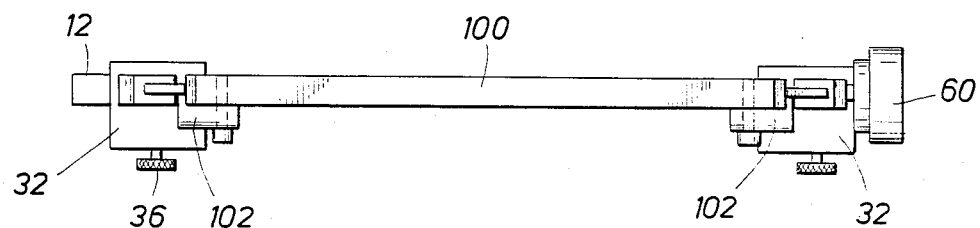
FIG. 8 is a partially broken away top view taken along line 8—8 of FIG. 7.
Figure 9:
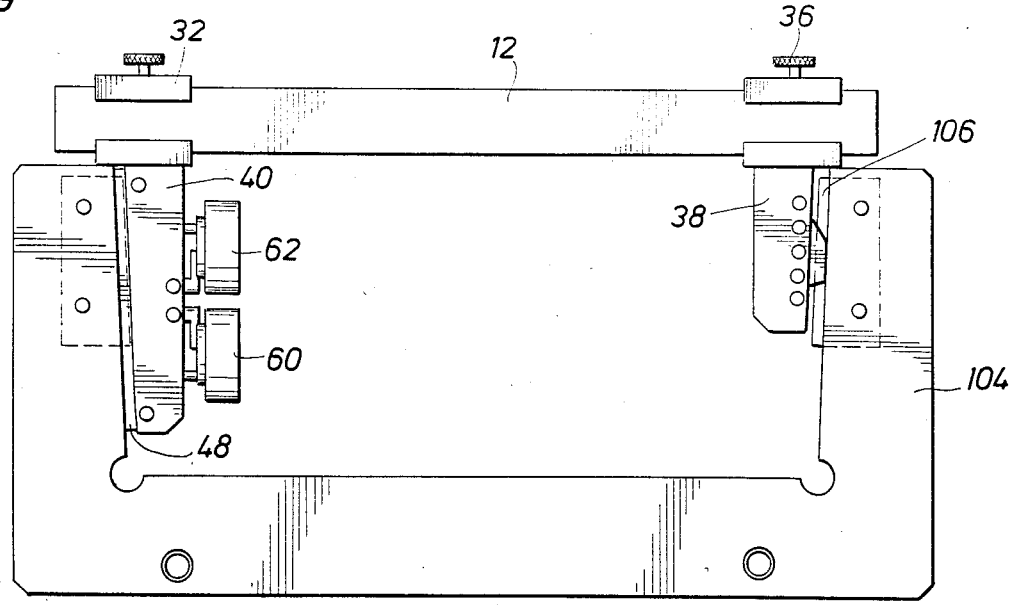
FIG. 9 is a side view of the thread guage of the invention being calibrated against a standard for measurement of internal threads.

The thread guage of the invention is a type of comparator guage and must, therefore, be nulled or zeroed against a standard. In FIGS. 7-9, an alternate embodiment of the apparatus 10 is shown being calibrated against a standard. In this embodiment, the alignment bracket 14 has been eliminated. Alignment of the apparatus 10 on the pipe end is accomplished by adjustment of the alignment bolts 33 on the clamps 32 and visually positioning the arms 38 and 40 about the thread form. The bolts 33 provide a stop surface or shoulder for contacting the end face of the pipe and positioning the apparatus 10 relative to the thread form. The shoulder provided by the bolts 33 lies in a plane normal to the end face of the pipe.

A standard 100 is shown in FIGS. 7 and 8 for calibration of the apparatus 10 for measurement of external threads. The standard 100 is machined to the specifications for various thread forms. API specifications for thread forms are widely circulated throughout the industry. However, since the apparatus 10 is a comparator guage, it is easily adaptable for measurement of proprietary thread forms. All that is required is a standard machined to the proprietary thread specifications.

The standard 100 includes a pair of guide flanges 102 for positioning the standard on the apparatus 10. The flanges 102 contact the inserts 42 and 48 when the standard 100 is properly positioned on the apparatus 10. In FIG. 9, a standard 104 for calibration of the apparatus 10 for measurement of internal threads is shown. The standard 104 is provided with flanges 106 for properly aligning the standard on the apparatus 10.

Figure 13:
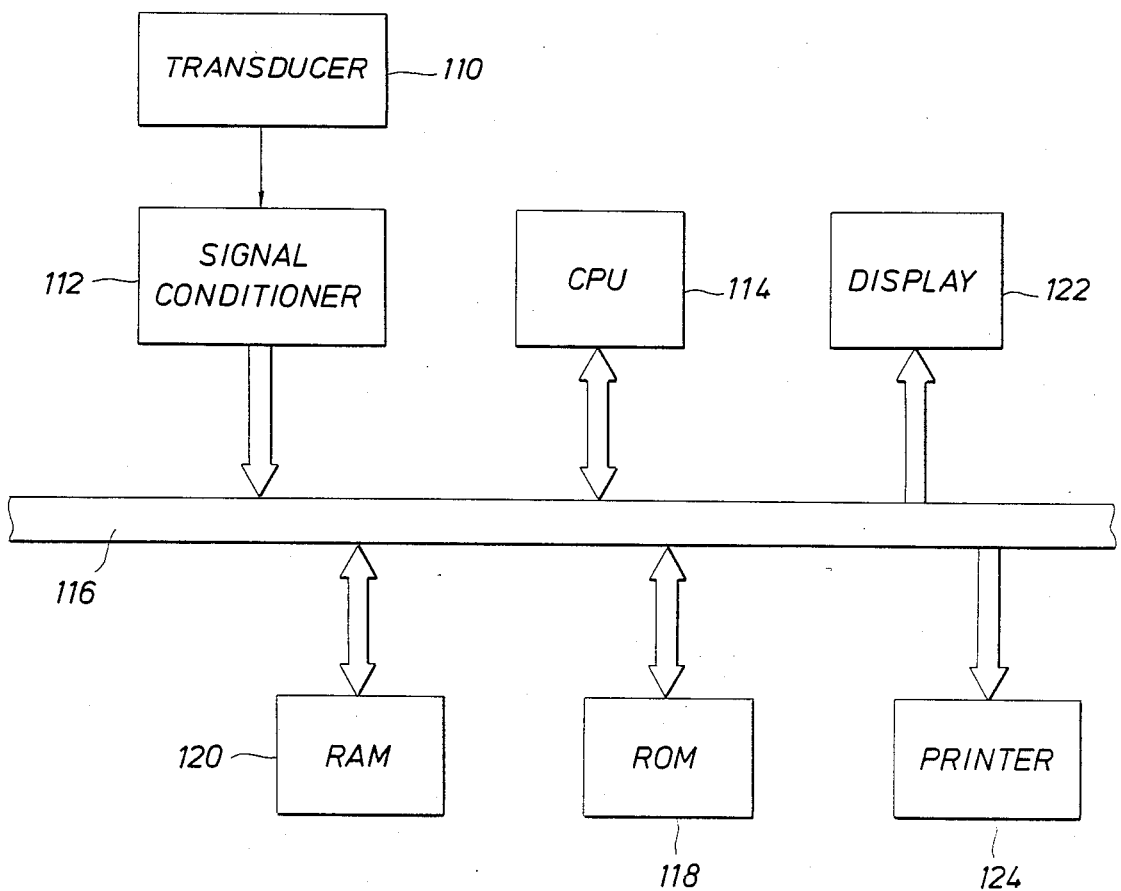
FIG. 13 is a flow chart and schematic diagram illustrating an alternate embodiment of the invention.

Referring now to FIG. 13, a flow chart and schematic diagram of an alternate embodiment of the indicator means for comparing thread form dimensions is shown. The apparatus 10 described herein is not limited solely to mechanical measurement of a thread form. Electronic devices are available for measurement of thread form dimensions. For example, a linear transducer may be substituted for the guages 60 and 62 on the arm assembly 30. Displacement of the insert 48 in or out of the slot 41 is detected by the transducer 110, which displacement is registered by the transducer 110 as the deviation of the thread form from the standard. The deviation values are transmitted to a signal conditioner 112 which converts the electronic signals to a recognizable form for the CPU 114. The signal conditioner 112 and CPU 114 shown in FIG. 13 are interconnected by a bus 116 in a known manner. The CPU 114 controls the system operation for calculating the pitch diameter and taper of a measured thread form. The ROM 118 memory cell stores the system programs which are permanently fixed. Included in the ROM 18 are the geometric and slope formulas for calculating the pitch diameter and taper of a measured thread form. The calculated values of pitch diameter and taper are stored in the RAM 120 memory cell and are compared to the specified values for the specific thread form to determine if the measured thread form is within the acceptable tolerance or deviation. The calculated values may be displayed on an LED display 122 or printed by a printer 124. A power supply and charging circuit (not shown in the drawings) are provided for operation of the CPU 114. Batteries provide the power source for normal operation of the apparatus in the field. The apparatus may also be provided with a standard RS 232 terminal for communication with a remote system or printer.

USE OF THIS DEVICE

The apparatus 10 of the invention indirectly measures both pitch diameter and taper of a thread form. The pitch diameter of a thread is the diameter of an imaginary cone which pases through the thread profile at approximately the thread center. Taper is the change in the pitch diameter of round thread and the change in the root diameter of a Buttress thread. The root of a thread is the bottom of the thread. Both pitch diameter and taper are determined simultaneously using the apparatus 10 of the invention.

The apparatus 10 of the invention is a form of comparator guage and must be nulled or zeroed against a standard. Thus, a standard for each type of thread and pipe size is required. The standards used with the apparatus 10 are normally dimensioned to the crest-to-crest diameter of the thread form being measured. For 8-round thread forms, the crest-to-crest diameter is the pitch diameter plus twice the addendum of the thread. The addendum of the thread is the distance between the pitch line and the crest of the thread. The standards are machined and ground to the exact taper of the crest-to-crest taper. Taper is defined as the diametrical change in pitch diameter per foot of axial pipe length. For all 8-round and Buttress threads on pipe sizes less than 16 inches in diameter, the taper is three quarters (¾) of an inch per foot. For Buttress threads on pipe sizes larger than 16 inches in diameter the taper is one (1) inch per foot.

Since the thread forms are tapered, an infinite number of pitch diameters are possible. The pitch diameter for tubular goods is defined at a position and a specified dimension from the pin or coupling face. The dimensions and specifications of standard thread forms are published in the API Bulletin 5B. In all instances, the pitch diameter line is at a known distance from the thread crest when the threads are machined to the proper specifications. Therefore, the thread height of the thread form being measured must first be verified prior to use of the apparatus 10. Verification on the thread height is easily accomplished with a thread height guage.

Prior to use of the apparatus 10, it is first nulled or zeroed against a standard. The dial indicator guages 60 and 62 indicate negative values when the indicator probes 72 and 74 travel "out" and positive values when the probes travel "in". On external threads, this does not present a problem. However, sign conversion is required in the calculation of pitch diameter and taper of internal threads.

Once the apparatus 10 has been nulled against the standard, it is positioned on a pipe end as shown in FIG. 1. The arm assemblies 28 and 30 are positioned so that the thread engaging inserts 42 and 48 contact the thread. The pipe end rests on the inserts 18 and alignment bolts 33 of the clamps 32. Since the insert 48 is urged outwardly by the springs 58, it will contact the thread along the leading edge 54. Movement of the insert 48 in or out of the slot 41 is registered on the guages 60 and 62. If the guages 60 and 62 both read zero, the thread being guaged in that plane is precisely correct and dimensionally the same as the nulling standard. When the guages 60 and 62 indicate the same value, the taper of the thread is the same as the standard and the pitch diameter of the thread is incrementally different from the standard by the amount indicated on the guages 60 and 62.

When the dial indicator guage readings are unequal, certain calculations must be made to determine the taper and pitch diameter of the thread form at the plane being measured. Making these calculations in the field while gauging threads is no practical. Therefore, deviation charts have been established for specific thread forms. In Table 1, the pitch diameter and taper for incremental indicator guage deviations have been calculated for an 8-round standard thread having a diameter of 7.625 inches. Similar charts have been prepared for various thread forms and pipe sizes. The values read from the guages 60 and 62 are plotted along the x and y axis of Table 1. The chart intersection of any two values provides the pitch diameter and taper for a measured thread form having that combination of guage values. For example, the taper and pitch diameter of a thread form yielding measured values for x and y of +0.002 and +0.003, respectively, is a taper of 0.0615 inches per foot and a pitch diameter of 7.5264 inches.

TABLE 1

|  | −.003 | −.002 | −.001 | +.000 | +.001 | +.002 | +.003 |
|---|---|---|---|---|---|---|---|
| −.003 | 0.0625 | 0.0615 | 0.0605 | 0.0595 | 0.0585 | 0.0575 | 0.0565 |
|  | 7.5212 | 7.5214 | 7.5217 | 7.5219 | 7.5222 | 7.5224 | 7.5226 |
| −.002 | 0.0635 | 0.0625 | 0.0615 | 0.0605 | 0.0595 | 0.0585 | 0.0575 |
|  | 7.5220 | 7.5222 | 7.5224 | 7.5227 | 7.5229 | 7.5232 | 7.5234 |
| −.001 | 0.0645 | 0.0635 | 0.0625 | 0.0615 | 0.0605 | 0.0595 | 0.0585 |
|  | 7.5227 | 7.5230 | 7.5232 | 7.5234 | 7.5237 | 7.5239 | 7.5242 |
| +.000 | 0.0655 | 0.0645 | 0.0635 | 0.0625 | 0.0615 | 0.0605 | 0.0595 |
|  | 7.5235 | 7.5237 | 7.5240 | 7.5242 | 7.5244 | 7.5247 | 7.5249 |
| +.001 | 0.0665 | 0.0655 | 0.0645 | 0.0635 | 0.0625 | 0.0615 | 0.0605 |
|  | 7.5242 | 7.5245 | 7.5247 | 7.5250 | 7.5252 | 7.5254 | 7.5257 |
| +.002 | 0.0675 | 0.0665 | 0.0655 | 0.0645 | 0.0635 | 0.0625 | 0.0615 |
|  | 7.5250 | 7.5252 | 7.5255 | 7.5257 | 7.5260 | 7.5262 | 7.5264 |
| +.003 | 0.0685 | 0.0675 | 0.0665 | 0.0655 | 0.0645 | 0.0635 | 0.0625 |
|  | 7.5258 | 7.5260 | 7.5262 | 7.5265 | 7.5267 | 7.5270 | 7.5272 |

The calculations for determining the pitch diameter and taper of thread forms are based upon the geometry of similar triangles and slope equations. Taper is a function of the slope established by the measured values of x and y and is expressed as follows:

$T = f(x,y)$

The pitch diameter (PD) is a function of the taper, x and y and is expressed as follows:

$PD = f(T,x,y)$

While the calculations can be done manually, it is a very tedious process and not practical. The only variables in the equations are the measured values of x and y and therefore use of the deviation charts, which are computer generated for specific thread forms, is very convenient, particularly for field inspection of threads. Thus, charts similar to Table 1 are used for different thread forms.

Several measurements are taken about the thread form to determine an average value of x and y of the thread form. The average value of x and y is used to calculate the pitch diameter and taper of the thread form. The apparatus 10 also provides an indication of the ovality of the thread form. Differences in the values of x and y measured at several points about the thread form, particularly substantial differences, is an indication that the thread form is out of round.

While the foregoing is directed to the preferred embodiment of the present invention, other and further embodiments of the invention may be devised without departing from the basic scope thereof, and the scope thereof is determined by the claims which follow.

What is claimed is:

1. A thread gauge, comprising;
   (a) a bar member having oppositely extending end portions;
   (b) protruding arm means adjustably mounted on said bar member;
   (c) means for locking said arm means at a selected location along said bar member;
   (d) thread engaging means connected to said arm means;
   (e) alignment for positioning said arm means relative to a thread form for engagement by said thread engaging means;
   (f) bias means supported by said arm means for urging said thread engaging means into engagement with the thread form; and
   (g) indicator means supported by said arm means cooperating with said thread engaging means for comparing thread form dimensions relative to a standard.

2. The apparatus of claim 1 wherein said alignment means comprises a bracket having a pair of upstanding, spaced, and substantially parallel side portions defining a channel therebetween, said bracket further including at least one blade received within said channel and having an exposed edge protruding from said channel, said exposed edge defining a plane normal to an end face of a tubular member having a thread form thereon.

3. The apparatus of claim 2 wherein said bracket includes a transverse slot sized to engage said bar member at a point which is substantially an equal distance from said oppositely extending end portions.

4. The apparatus of claim 1 wherein said indicator means comprises at least two gauges operatively connected to said thread engaging means.

5. The apparatus of claim 4 wherein said thread engaging means includes an insert movably mounted to said arm means, said insert including a thread engaging leading edge and a rearward edge in contact with spring means located on said arm means, said spring means applying an outward force to said insert.

6. The apparatus of claim 5 wherein said insert is moveable between a first and second position, which movement is observed as first and second values by said indicator means, and such values determine pitch diameter and taper of the thread form.

7. the apparatus of claim 1 wherein said arm means include clamp means at one end thereof, said clamp means defining a channel cavity slideably receiving the end portions of said bar member and further including set screws for locking said arm means at a selected location along said bar member.

8. The apparatus of claim 1 wherein said thread engaging means includes a thread stop mounted to said arm means.

9. The apparatus of claim 1 wherein said alignment means comprises a shoulder located on said locking means for engaging an end face of a tubular member having a thread form thereon, said shoulder lying in a plane normal to said face.

10. The apparatus of claim 1 including transducer means operatively connected to said thread engaging means, and computer means in communication with said transducer means for calculating pitch diameter and taper of a measured thread form.

11. A thread guage, comprising:
   (a) a bar member having oppositely extending end portions;
   (b) an alignment bracket mounted on said bar member
   (c) a pair of arm assemblies adjustably mounted on said bar member;
   (d) means for locking each of said arm assemblies at a selected location along said bar member;
   (e) thread engaging means connected to each of said arm assemblies;
   (f) said locking means including a shoulder located thereon cooperating with said alignment bracket for positioning said arm assemblies relative to a thread form;
   (g) bias means supported by one of said arm assemblies for urging said thread engaging means into engagement with the thread form; and
   (h) indicator means connected to one of said arm assemblies cooperating with said thread engaging means for comparing thread form dimensions relative to a standard.

12. The apparatus of claim 11 wherein said alignment bracket includes a pair of upstanding, spaced, and substantially parallel side portions defining a channel therebetween, said bracket further including at least one blade received within said channel and having an exposed edge protruding from said channel, said exposed edge defining a plane normal to an end face of a tubular member having a thread form thereon.

13. The apparatus of claim 11 wherein said indicator means comprises at least two gauges operatively connected to said thread engaging means.

14. The apparatus of claim 13 wherein said thread engaging means includes an insert movably mounted to said arm means, said insert including a thread engaging leading edge and a rearward edge in contact with spring means located on said arm means, said spring means applying an outward force to said insert.

15. The apparatus of claim 14 wherein said insert is moveable between a first and second position, which movement is observed as first and second values by said indicator means, and such values determine pitch diameter and taper of the thread form.

16. The apparatus of claim 11 including transducer means operatively connected to said thread engaging means, and computer means in communication with said transducer means for calculating pitch diameter and taper of a measured thread form.

17. A method for determining the taper and pitch diameter of a thread formed on a tubular member, comprising the steps of:
   (a) calibrating a thread gauge with a standard for a specific thread form;
   (b) aligning the thread guage relative to the thread form;
   (c) contacting the thread form simultaneously at least at two separate points in axial alignment along said thread form;
   (d) determining at least two values of the thread form at the points of contact; and
   (e) calculating the taper and pitch diameter of the thread form as a function of the determined values at the points of contact.

18. The method of claim 17 wherein the step of calculating the taper and pitch diameter of the thread form includes transmitting a signal representing the determined values of the thread form from a transducer means mounted on said thread gauge to computer means which calculates and displayes the pitch diameter and taper.

* * * * *